United States Patent [19]

Masuyama

[11] 4,379,173
[45] Apr. 5, 1983

[54] PROCESS FOR PREPARING BISCUITS CONTAINING GLUCOMANNAN

[76] Inventor: Yoshinari Masuyama, No. 5-19-19, Higashi Gotanda, Shinagawa-ku, Tokyo, Japan, 141

[21] Appl. No.: 251,096

[22] Filed: Apr. 6, 1981

Related U.S. Application Data

[63] Continuation-in-part of Ser. No. 96,159, Nov. 20, 1979, abandoned.

[30] Foreign Application Priority Data

Oct. 5, 1979 [JP] Japan ................... 54-128035

[51] Int. Cl.³ ............................. A21D 13/08
[52] U.S. Cl. ................. 426/549; 426/804; 426/551; 426/558
[58] Field of Search ........... 426/549, 653, 655, 496, 426/573, 804, 451, 557, 640, 551, 558

[56] References Cited

U.S. PATENT DOCUMENTS 2,145,016  1/1939  Spalding .................. 426/549
2,952,548  9/1960  Work ........................ 426/99
3,023,104  2/1962  Battista ..................... 426/573

OTHER PUBLICATIONS

*Mannan Ace*, Minato Pharmaceutical Co., Ltd., Tokyo, Japan.

Primary Examiner—Raymond N. Jones
Assistant Examiner—Elizabeth J. Curtin
Attorney, Agent, or Firm—Armstrong, Nikaido, Marmelstein & Kubovcik

[57] ABSTRACT

A process for preparing glucomannan containing biscuits is provided. A roasted flour is prepared and glucomannan powder is mixed with the roasted flour. Water and gluten contained in the roasted flour provide a binding effect between the glucomannan powder and flour. The mixture is placed in a mold for baking at a relatively low temperature of 70° to 85° C.

5 Claims, No Drawings

PROCESS FOR PREPARING BISCUITS CONTAINING GLUCOMANNAN

This application is a continuation-in-part application of an earlier application Ser. No. 096,159 filed Nov. 20, 1979 now abandoned.

BACKGROUND OF THE INVENTION

The present invention relates to a process for preparing biscuits containing glucomannan powder obtained by pulverizing glucomannan, a non-caloric carbohydrate, particularly that contained in a large amount in a tuberous root of devil's tongue (*Amorphophallus konjac* C. Koch) and then purifying the same. The glucomannan powder is obtained by, for example, extracting devil's-tongue powder with water under 1.5 atmos. or with a 10% liver oil solution, then adding Fehling's solution thereto to effect precipitation, then treating the precipitates with hydrochloric acid, filtering the precipitates and purifying the same by washing with ethanol.

It is common knowledge that the number of obese people is presently increasing. This increase is probably due to improvements in economic and food conditions from 1960 onward and changes in modes of living. It is considered that corpulence is undesirable for maintaining ones health and a graceful figure, particularly for women.

In recent years, glucomannan powder has been popularly used (for example, glucomannan powder is available on the market in an aluminum pack containing a dose thereof, which is stirred in water before use) as a means of body weight reduction for obese people. The glucomannan powder is essentially tasteless and odorless, but it cannot be taken easily by some people.

For overcoming these problems, the present inventor has previously proposed: (a) a confectionery containing glucomannan powder as the main component and which is prepared by packing a suitable amount of glucomannan powder air-tightly in a capsule of a desired shape, which capsule is made of edible gelatin, and coating the capsule with a suitable confectionery material to form an outer layer, (b) a confection mainly comprising glucomannan powder and an oil prepared by mixing a suitable amount of glucomannan powder with a suitable amount of an oil and coating the periphery of the mixture air-tightly with a layer of a confectionery material and (c) a confection mainly comprising glucomannan powder prepared by enclosing a suitable amount of glucomannan powder with a shell made of a confectionery material (see Japanese Utility Model Application Nos. 063,611/1979; 095,628/1979 and 128,545/1979). These confectioneries, are now made on an experimental basis and have been sampled to reveal that they can attain the intended purposes sufficiently.

However, in the confections of the prior applications, glucomannan powder is enclosed therein along or in the form of a mixture with an oil. In other words, glucomannan powder is not combined with flour which is indispensible for making ordinary confections (excluding candies). Confectionery made with glucomannan powder has not been accepted by the general public. A further improvement is desired for using glucomannan for a confection, though the confections of the prior applications are still far superior to the case wherein glucomannan is taken as powder.

It is an object of the present invention, therefore, to provide very palatable biscuits containing glucomannan.

Another object of the present invention is to provide a process for preparing biscuits containing glucomannan having the effects of glucomannan powder per se, i.e., satisfaction of appetite and inhibition of absorption of nourishments.

Still another object of the present invention is to provide a process for preparing biscuits containing glucomannan on a large scale and at a low cost, which biscuits can be easily stored and transported.

SUMMARY OF THE INVENTION

The technique for accomplishing these objects according to the present invention comprises thoroughly mixing a suitable amount of flour with glucomannan to provide a binding effect through the water and gluten contained in the flour, and then placing the mixture in a mold and baking. In the resulting product, glucomannan powder is homogeneously combined with the flour. The product has a fragrant flavor.

DESCRIPTION OF THE PREFERRED EMBODIMENTS

The flour employed in the process according to the present invention is subjected to a roasting step prior to being combined with the glucomannan powder. To prepare a biscuit, 10 to 20 parts by weight of glucomannan powder is added to about 80 to 90 parts by weight of the roasted flour and mixed until a binding effect of gluten in the flour is obtained. A relatively small amount of water may be added before or during the mixing of the glucomannan powder and the roasted flour. When water is employed, the mixing is completed in a short time to prevent the glucomannan powder from absorbing water. Water, if used, is employed in an amount of about 0.1 to 15 parts by weight together with about 10 to 20 parts by weight of the glucomannan powder and about 80 to 90 parts by weight of the roasted flour.

The particle size of the glucomannan powder is not critical in the practice of the present invention. Either commercially available glucomannan powder with a particle size range of 50–80 mesh or finely divided glucomannan powder with a particle size range of 100–200 mesh may be used. The flour may also be of any commercial grade.

The mixture of glucomannan powder and roasted flour and, optionally, water, is then baked at a temperature of about 70° to 85° C. for 25 to 45 minutes and preferably at a temperature of about 80° C. for about 30 to 40 minutes.

The range of baking temperature of 70° to 85° C. is important in making a glucomannan-containing biscuit. Temperatures used in baking conventional biscuits, which range from about 140° to 200° C., are too high for baking glucomannan-containing biscuits because at baking temperatures above about 85° C., the properties of the glucomannan are changed. After being subjected to such high temperatures glucomannan will not swell or absorb water when contacted with water. Thus, glucomannan containing biscuits baked at temperatures above 85° C. are not effective as a dietary food becuase when taken into the stomach, they will not absorb water or swell to fill the stomach.

However, when a mixture of glucomannan powder and flour is baked at low temperatures, such as 70° to 85° C., the baked biscuits will have an unappetizing taste unless the flour is subjected to prior roasting. By roasting the flour prior to being combined with the glucomannan powder, an appetizing glucomannan-containing biscuit having improved taste can be obtained which is effective as a dietary food. Preferably, flour is roasted at temperatures of 130°-200° C. for 1-2 hours although these roasting conditions are not critical and may vary with the quantity of flour to be roasted.

In preparing a glucomannan containing biscuit according to the present invention, additional ingredients conventionally employed in the preparation of confections including, for example, milk, margarine, shortening, sorbitol, baking powder and the like can also be used. The amount of these additional ingredients employed in the mixture does not appear critical. Preferably, the amount of these additional ingredients ranges from 30% to 60% by weight based on the total weight of a mixture containing glucomannan, flour and additional ingredients.

The present invention will be further illustrated by the examples that follow. In each of the examples, the flour employed has been subjected to a prior roasting step at 170° C. for 1.5 hours. Baking is carried out at a temperature of about 80° C. for 30-40 minutes. All parts are by weight unless otherwise specified.

EXAMPLE 1

10-20 parts of glucomannan powder are mixed thoroughly with about 80 parts of flour to provide a binding effect. Then the mixture is placed into molds and baked to provide glucomannan-containing biscuits.

EXAMPLE 2

10 parts of glucomannan powder are mixed thoroughly with 80 parts of flour and 10 parts of shortening to provide a binding effect. Then, the mixture is placed into molds and baked.

EXAMPLE 3

10 parts of glucomannan powder are mixed thoroughly with 80 parts of flour and 10 parts of water or cow's milk to provide a binding effect. Then, the mixture is placed in molds and baked.

EXAMPLE 4

A suitable amount of a flavor is incorporated into the mixture of Examples 1-3 and the whole is treated in the same manner as shown above to obtain biscuits.

EXAMPLE 5

150 g of flour, 30 g of soy bean protein, 20 g of glucomannan powder, 50 g of sorbitol, 50 g of shortening, 1 g of baking powder, 5 g of milk powder, 6 g of egg, 2.5 g of a flavor and 1.5 g of salt are kneaded well. The mixture is placed in molds and baked into biscuits.

In Examples 1-4, 40 biscuits each with a diameter of about 5 cm, a thickness of about 4 cm and a weight of about 5 g are obtained from 200 g of the dough.

In Example 5, 82 biscuits each with a diameter of about 5 cm, a thickness of about 4 cm and a weight of about 5 g are obtained from 408 g of the dough.

What is claimed is:

1. A process for preparing biscuits containing glucomannan consisting essentially of the steps of:
   adding a sufficient amount of glucomannan powder to a predetermined amount of roasted flour so as to provide a binding effect through the water and gluten contained in the flour,
   mixing the glucomannan powder and flour until a binding effect of gluten is obtained,
   placing the mixture into a mold, and
   baking the mixture in the mold at a temperature of from about 70° to 85° C. for about 25 to 45 minutes.

2. A process according to claim 1 wherein the baking step is carried out at a temperature of about 80° C. for about 30 to 40 minutes.

3. A process according to claim 1 wherein about 10 to 20 parts by weight of glucomannan powder is added to about 80 to 90 parts by weight of flour.

4. A process according to claim 1 which further comprises adding a relatively small amount of water before or during the mixing of the glucomannan powder and flour and completing the mixing within a short time to prevent the glucomannan powder from absorbing the water.

5. A process according to claim 4 wherein about 0.1 to 15 parts by weight of water is added to a mixture of about 10 to 20 parts by weight of glucomannan powder and about 80 to 90 parts by weight of flour.

* * * * *